United States Patent [19]
Matousek et al.

[11] Patent Number: 5,615,989
[45] Date of Patent: Apr. 1, 1997

[54] CONVERGING MEMBER AND RELATED APPARATUS FOR CONVEYING GRANULAR MATERIAL

[75] Inventors: Robert A. Matousek, Milan, Ill.; James W. Minnihan, Racine, Wis.

[73] Assignee: Case Corporation, Racine, Wis.

[21] Appl. No.: 677,788

[22] Filed: Jul. 10, 1996

Related U.S. Application Data

[63] Continuation of Ser. No. 492,373, Jun. 19, 1995, abandoned.

[51] Int. Cl.$^6$ .................................................. A01D 41/00
[52] U.S. Cl. ...................... 414/502; 198/670; 414/526; 414/528
[58] Field of Search .................................. 198/670, 671; 414/502, 503, 504, 505, 526, 528

[56] References Cited

U.S. PATENT DOCUMENTS

| | | | |
|---|---|---|---|
| 2,066,756 | 1/1937 | Anderson | 198/670 |
| 2,236,407 | 3/1941 | Jones | 198/670 |
| 2,751,060 | 6/1956 | Rademacher | 198/670 |
| 3,580,384 | 5/1971 | Pingree | 198/670 |
| 3,664,525 | 5/1972 | Herbsthofer | 414/505 |
| 3,769,988 | 11/1973 | Burenga | 414/526 |
| 3,872,982 | 3/1975 | Rowland-Hill et al. | 414/503 |
| 4,093,087 | 6/1978 | DeCoene | 414/526 |
| 5,217,108 | 6/1993 | Newman | 198/670 |

FOREIGN PATENT DOCUMENTS

| 11259 | 1/1988 | Japan | 198/670 |
|---|---|---|---|

*Primary Examiner*—Thomas J. Brahan
*Attorney, Agent, or Firm*—Jansson & Shupe, Ltd.

[57] ABSTRACT

An apparatus for conveying granular material includes a first conveyor (such as an auger) feeding a second conveyor. In the improvement, the first conveyor feeds granular material into a cone-like converging member. Such converging member defines an area which generally decreases in the direction of material movement. Such converging member may have any of several shapes and a truncated cone shape is preferred for effectiveness, ease of fabrication and the like. In specific applications of the new apparatus on a grain combine, the volume of corn conveyed by the apparatus increased 15% or more when using the converging member.

2 Claims, 4 Drawing Sheets

CONVERGING MEMBER AND RELATED APPARATUS FOR CONVEYING GRANULAR MATERIAL

RELATED APPLICATION

This application is a continuation of application Ser. No. 08/492,373 filed Jun. 19, 1995, and now abandoned.

FIELD OF THE INVENTION

This invention relates generally to conveyors and, more particularly, to power-driven conveyors for moving finely-divided, e.g. granular, material.

BACKGROUND OF THE INVENTION

Powered conveyors for moving granular material are configured in any of a wide variety of types. Examples include generally-flat belt conveyors (either horizontal or inclined), inclined ladder conveyors equipped with protruding paddle-like flights and auger conveyors, sometimes known as screw conveyors. Often, the area immediately above the conveyor is unobstructed and the material being conveyed need not pass through any type of restriction. However, not all coveyors function in such an operating environment.

An example is the conveying system on an agricultural machine known as a combine. A combine might be termed a "cutting-and-threshing" machine in that it cuts a plant stalk and then threshes such stalk to separate the desired grain from the associated stalk or plant portion. Combines are used to harvest, e.g., soybeans, corn, wheat and rice, and the leading manufacturer of such machines is Case Corporation of Racine, Wis.

Stalk threshing is by a rotating perforated drum and when the grain is separated, it falls through the openings in the drum onto an apron-like trough. An open-top conveyor (e.g., a screw-like auger conveyor) operates along the length of the trough to move the grain out of the trough and through a tube to another conveyor. The second conveyor deposits the grain in a bin on the combine for later transfer to a haulage wagon or the like.

While the foregoing arrangement generally works well, it is not without its problems. A significant problem arises from environment in which the first conveyor is required to operate. Such first conveyor is "open-topped" along much of its length so that grain falling through the threshing drum may fall freely onto and flow into such conveyor for grain movement. However, toward it discharge end, such conveyor is required to urge the grain into and through a restricting tubular guide portion which "focuses" the grain flow to the second conveyor.

The abruptness of the restriction impedes free movement of grain. Grain is thereby caused to "bunch" or deflect at that location and the smooth forward progress of grain movement is impeded. As a result, the efficiency of the conveying arrangement is adversely affected.

Increasing the speed of the conveying arrangement seems to do little if anything to improve conveying rate. In a specific embodiment, the drive speed of the arrangement was increased about 15% and the amount of corn conveyed thereby actually decreased slightly. (In other embodiments, an increase in drive speed did produce a modest increase in the rate at which grain was conveyed.)

An apparatus which resulted in higher conveyor output without increasing drive speeds, which is easy to fabricate, which is low in cost and which can be retrofitted to certain existing combines would be an important advance in the art.

OBJECTS OF THE INVENTION

It is an object of the invention to provide an improved conveying apparatus overcoming some of the problems and shortcomings of the prior art.

Another object of the invention is to provide an improved conveying apparatus which is particularly useful for moving finely-divided material including grain.

Another object of the invention is to provide an improved conveying apparatus having improved efficiency.

Yet another object of the invention is to provide an improved conveying apparatus which is easy to manufacture.

Another object of the invention is to provide an improved conveying apparatus which is well adapted for use on grain combines.

Still another object of the invention is to provide an improved conveying apparatus which may be retrofitted to existing conveyor installations including those on grain combines.

Another object of the invention is to provide an improved conveying apparatus in which the improvement has a very modest cost in comparison to the striking benefit provided by such apparatus. How these and other objects are accomplished will become apparent from the following descriptions and from the drawings.

SUMMARY OF THE INVENTION

The invention is an improvement in an apparatus of the type for conveying granular material using a first conveyor "in series with" and feeding a second conveyor. In the improvement, the first conveyor feeds granular material into a converging member and the output of the apparatus is thereby increased. In one specific embodiment, the converging member is cone-shaped.

The first conveyor has a conveying axis extending along the conveyor in the direction of material movement. The converging member partially defines a cross-sectional area measured in a plane generally normal to the conveying axis. Most preferably, such cross-sectional area generally decreases as measured in the direction of material movement, i.e., toward the second conveyor.

In certain more-specific embodiments, such area decreases at a generally uniform rate, i.e., at a rate which is generally uniform per unit length of the first conveyor. And there are other embodiments described below in which the area decreases at a non-uniform rate. In either instance, the rate of area change is measured in units of square measure, e.g., square inches, per unit of linear measure, e.g., per inch.

Considered another way, the converging member and the conveying axis of the first conveyor define an included angle therebetween which is in the range of about 10° to about 80°. More preferably, such range is about 20° to 70° and most preferably, the range is about 30° to 60°.

In another aspect of the invention, the apparatus has a panel forming a tube-like material guide portion between the converging member and the second conveyor. Such guide portion has an inlet terminus with an input mouth defining a mouth cross-sectional area. The converging member has a narrow-mouth outlet terminus defining a terminus cross-sectional area which is about equal to that of the input mouth of the guide portion. Further, the shapes of such areas both closely approximate a circle.

In yet another aspect of the invention, the first conveyor is an auger conveyor and has a diameter. The converging member has an inlet terminus which is spaced from the outlet terminus by a dimension. In a specific embodiment, the dimension is at least equal to about 40% of the diameter of the auger conveyor.

Other details of the new apparatus are set forth in the following detailed description and in the drawings.

DETAILED DESCRIPTION OF PREFERRED EMBODIMENTS

Figure 1:
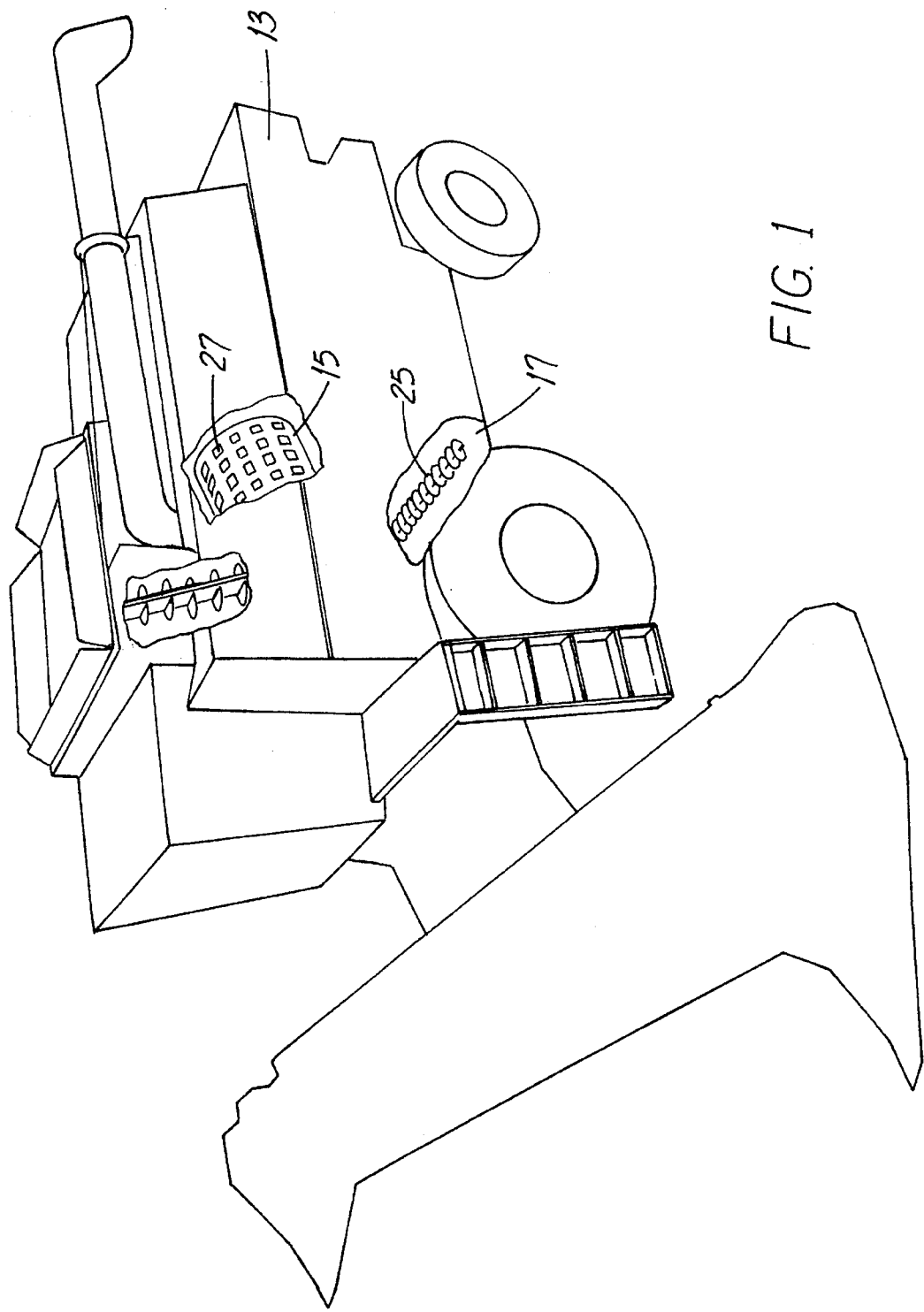
FIG. 1 is a representative perspective view of an agricultural combine, an exemplary application for the invention.
Figure 2:
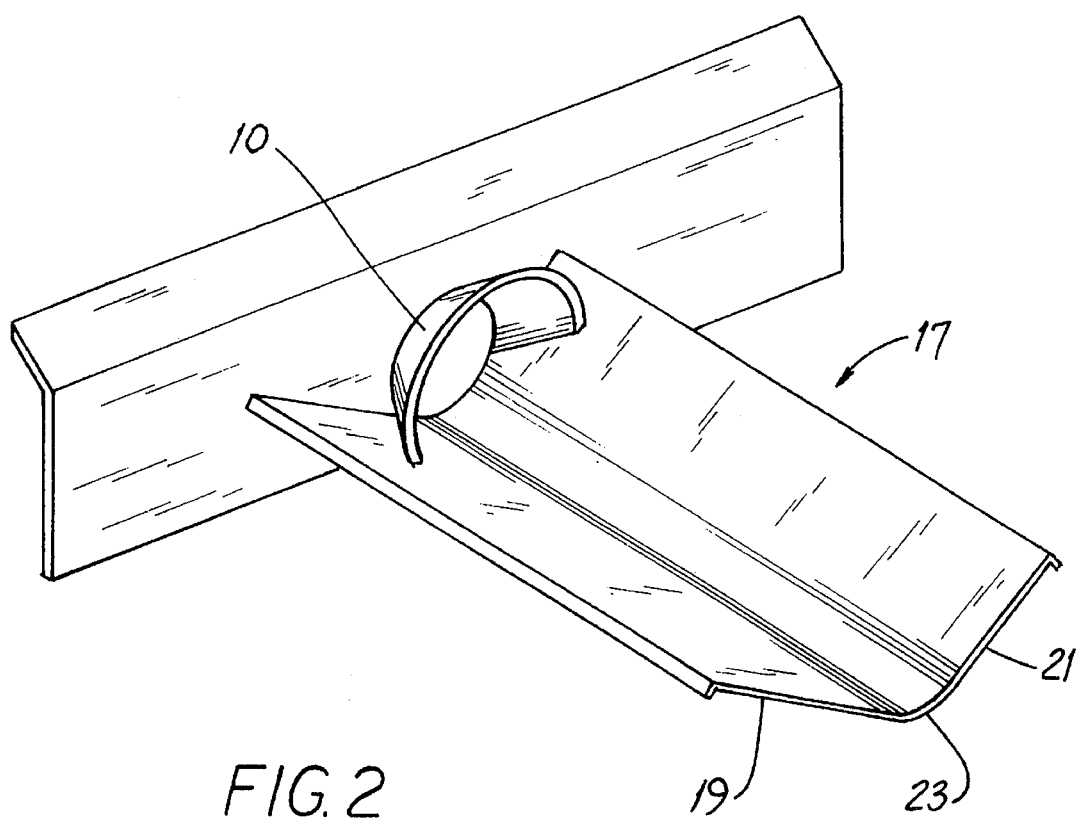
FIG. 2 is a perspective view of the new converging member shown in conjuction with a combine auger trough.
Figure 3:
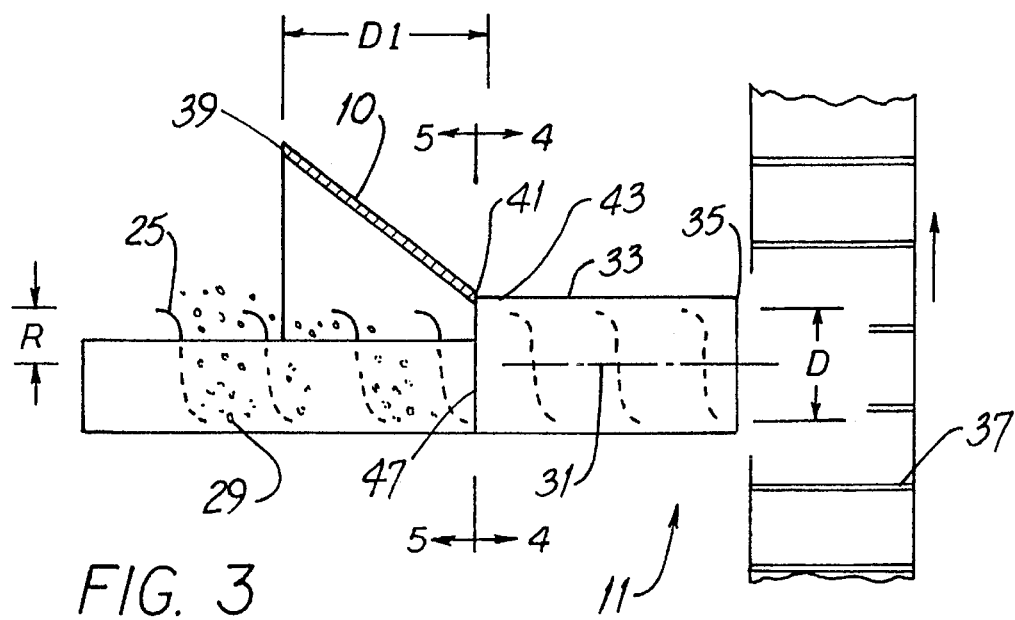
FIG. 3 is a representative side elevation view of a conveying apparatus equipped with the new converging member. Parts are broken away and other parts are shown in dashed line.

Before describing details of the inventive converging member 10 and related apparatus 11, it will be helpful to have an understanding of an exemplary application on which such converging member 10 and apparatus 11 may beneficially be used. Referring first to FIGS. 1, 2 and 3, FIG. 1 shows an agricultural combine 13 of the type equipped with a threshing drum 15 and a trough 17 which catches grain as it falls through the drum 15.

The trough 17 is comprised of two flat pans 19, 21 joined by a portion 23 having a radius of curvature generally equal to the radius R of the auger-type first conveyor 25 positioned adjacent to the trough 17 and, particularly, to the portion 23. The pans 19, 21 are at about a 120 degree angle to one another but such angle is not critical although it should be less than 180 degrees. As cut stalks of grain are threshed inside the drum 15, the grain kernels are separated from the stalks and fall through openings 27 in the drum 15 to the auger trough 17 below. Details of the conveying apparatus and its converging member 10 will now be described.

Referring particularly to FIGS. 2 and 3, the first conveyor 25, an a screw or auger of a diameter D, moves the grain 29 along a conveying axis 31 parallel to the trough portion 23. Such grain 29 is urged into and through the converging member 10 to a tube-like guide portion 33 which is generally cylindrical and of substantially uniform diameter. Material flowing through the outlet end 35 of the guide portion 33 discharges onto a second conveyor 37. In one preferred embodiment, the second conveyor 37 and the first conveyor 25 are of disparate types and in a specific embodiment, the first conveyor 25 is of the described auger type and the second conveyor 37 is an inclined ladder-type conveyor.

The converging member 10 has a wide-mouth inlet terminus 39 and an outlet terminus 41 which are spaced from one another by a dimension D1 measured generally parallel to the conveying axis 31. In a specific embodiment, the dimension D1 is at least equal to about 40% of the diameter D of the auger conveyor 25. To state it another way, the mathematical relationship of D and D1 may be expressed by: D1 is equal to or greater than 0.4 D. And most satisfactory results seem to occur when D1 is between 0.55 and 0.85 D.

Figure 4:
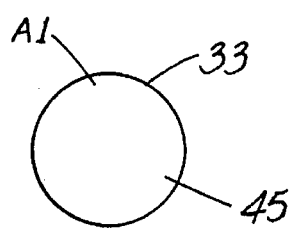
FIG. 4 is an elevation view of the inlet terminus of the guide portion of the apparatus of FIG. 3 taken along the viewing plane 4—4 thereof.
Figure 5:
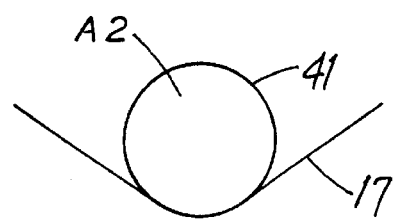
FIG. 5 is an elevation view of the outlet terminus of the converging member and of the apparatus auger trough of FIG. 3 taken along the viewing plane 5—5 thereof.

Referring also to FIGS. 4 and 5, the guide portion 33 has an inlet terminus 43, the mouth 45 of which defines a mouth cross-sectional area A1. The outlet terminus 41 of the converging member 10 forms a boundary of a cross-sectional area and (together with the trough 17) defines the area A2 with both areas A1, A2 being measured in a plane 47 generally normal to the conveying axis 31. In a highly-preferred embodiment, the areas A1 and A2 are about equal to one another. To put it in other words, the converging member 10 gradually "restricts" the flow of grain 29 down to an area A1 or A2 such that the grain "column" enters the inlet terminus 43 of the guide portion 33 with relative ease.

(It should be appreciated that in practice, the upper level of the conveyed grain 29 is likely to be well above the level depicted in FIG. 3. The converging member 10 gradually reduces such level for ease of grain entry into the guide portion 33.)

Figure 6:
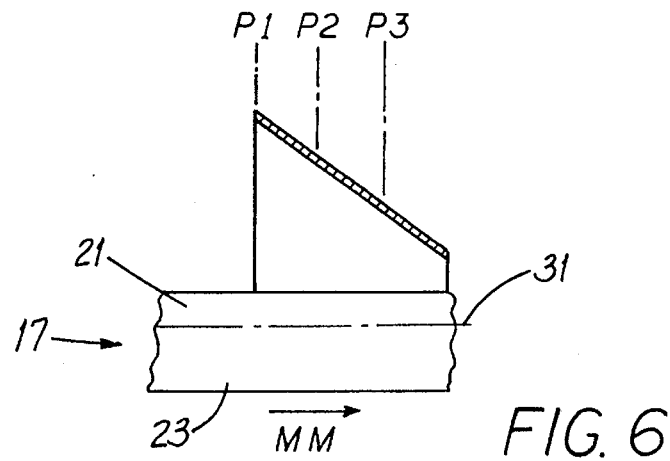
FIG. 6 is a side elevation view of one embodiment of the converging member shown in conjunction with an auger trough. The coverging member is in section view and parts of the auger trough are broken away.
Figure 7:
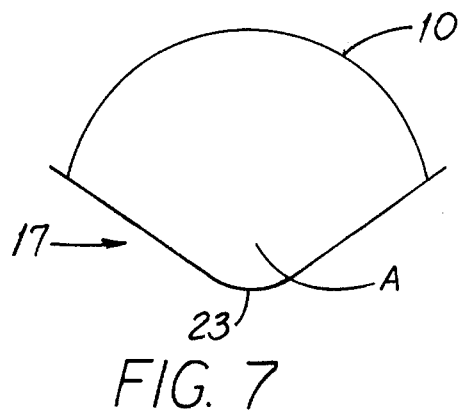
FIGS. 7, 8 and 9 represent the progressively-decreasing areas defined by the intersection of planes P1, P2 and P3, respectively, with the converging member and the auger trough of FIG. 6.
Figure 8:
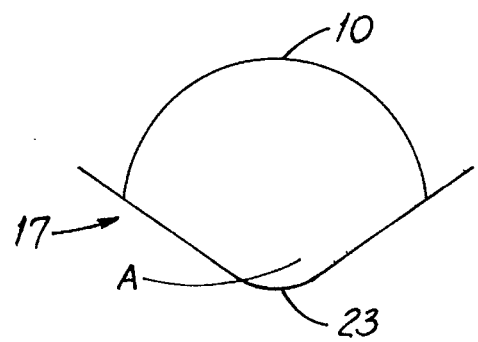
Figure 9:
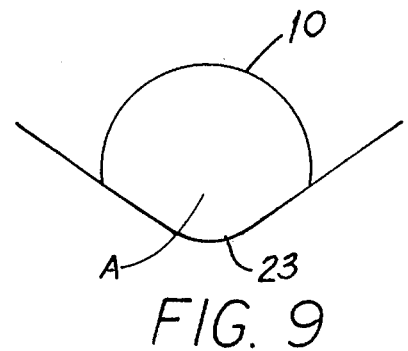

Referring also to FIGS. 6, 7, 8 and 9, the cross-sectional area A defined by the converging member 10 and the trough 17 generally decreases as measured in the direction of material movement represented by the arrow MM, i.e., toward the second conveyor 37. FIG. 6 shows three planes P1, P2 and P3 which are generally normal to the conveying axis 31. The planes P1 and P3 are equidistant from plane P2. The sequence of FIGS. 7, 8 and 9 illustrates how the area A decreases as measured in the direction of material movement. In the specific embodiment of FIGS. 2, 3 and 6, the converging member 10 is cone-shaped.

Figure 10:
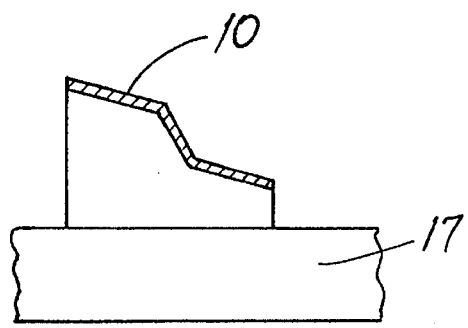
FIGS. 10 and 11 depict other embodiments of the new converging member shown in conjunction with an auger trough. The converging member is in section view and parts of the auger trough are broken away.
Figure 11:
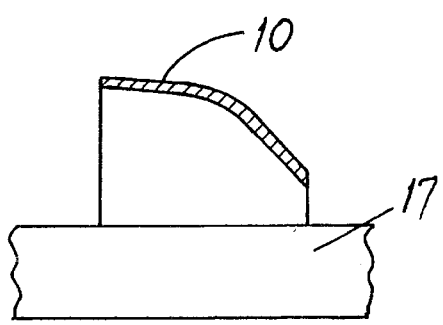

And there are other embodiments in which the area A decreases at a non-uniform rate. FIGS. 10 and 11 show other exemplary embodiments of the converging member 10 where rate-of-area-decrease is other than uniform.

Figure 12:
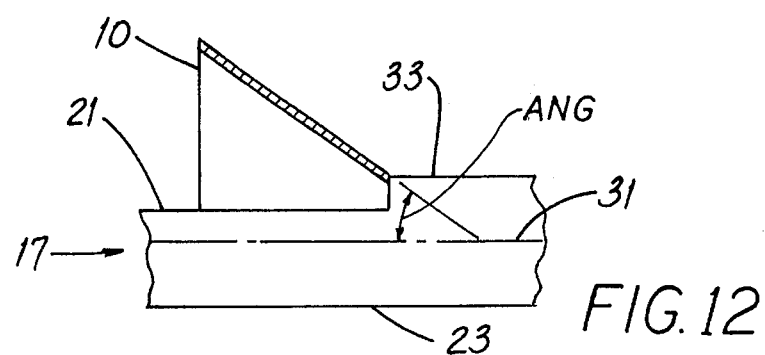
FIG. 12 shows an angular relationship between the converging member (shown in section) and the conveying axis. The depiction is in conjunction with the auger trough, parts of which are broken away.

Referring next to FIG. 12 (and in another aspect of the invention, the converging member 10 and the conveying axis 31 of the first conveyor 25 define an included angle ANG therebetween which is in the range of about 10° to about 80°. More preferably, such range is about 20° to 70° and most preferably, the range is about 30° to 60°.

The following information dramatizes the effectiveness of the invention in moving grain 29 more quickly from the auger trough 17 onto the second conveyor 37. Tests were conducted using substantially-dry corn having 12% moisture content and weighing 56 pounds per bushel. With a 7 inch diameter first conveyor 25, an 8 inch diameter guide portion 33 and using the same drive speed for both tests, the apparatus 11 moved about 7% more bushels per hour when such apparatus 11 was equipped with a converging member 10.

With an 8 inch diameter first conveyor 25 and a 9 inch diameter guide portion 33, the apparatus 11 moved about 12% more bushels per hour with the converging member 10 than without. And when the speed was increased about 15–16%, the output from the apparatus 11 increased about 18% over that occurring without the converging member 10.

While the principles of the invention have been shown and described in connection with specific embodiments, it is to be understood clearly that such embodiments are by way of example and are not limiting.

We claim:

1. In a grain-harvesting combine, the combination of a quantity of grain, a first conveyor for conveying the grain to a second conveyor, and trough pans lateral to the first conveyor and supporting the grain during conveying, and wherein:

the grain falls from a threshing drum to the trough pans;

the grain has an upper level above the first conveyor and covers the first conveyor;

the first conveyor extends along an axis substantially parallel to the trough pans, is of substantially uniform diameter along its length and conveys the grain through a coaxial converging member to a tubular guide portion between the converging member and a second conveyor, and wherein the converging member:

includes an inlet terminus substantially normal to the axis, thereby equally engaging the grain moving along the trough pans;

includes a substantially smooth interior surface for converging the grain into a guide portion feeding the second conveyor;

includes an outlet terminus having a generally-horizontal bottom formed by the trough pans; and extends partially around the first conveyor;

and wherein:

the guide portion is of substantially uniform cross-sectional area along its length, whereby the output of the second conveyor is increased.

2. The combination of claim 1 wherein:

the outlet terminus of the converging member has a cross-sectional area;

the guide portion has an inlet terminus, the cross-sectional area of which is substantially equal to that of the outlet terminus of the converging member.

* * * * *